(12) United States Patent
VanDuyn

(10) Patent No.: US 8,184,104 B2
(45) Date of Patent: May 22, 2012

(54) MULTIPLY TASKED TOUCHPAD REMOTE CONTROL

(75) Inventor: Luke VanDuyn, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 607 days.

(21) Appl. No.: 12/409,727

(22) Filed: Mar. 24, 2009

(65) Prior Publication Data

US 2010/0245255 A1    Sep. 30, 2010

(51) Int. Cl.
*G06F 3/041* (2006.01)
(52) U.S. Cl. .......................... 345/173; 345/82
(58) Field of Classification Search .................. None
See application file for complete search history.

(56) References Cited

U.S. PATENT DOCUMENTS

| | | | |
|---|---|---|---|
| 5,521,336 A | 5/1996 | Buchanan et al. | |
| 5,543,589 A | 8/1996 | Buchana et al. | |
| 5,565,658 A | 10/1996 | Gerpheide et al. | |
| 6,002,594 A | 12/1999 | Ledin et al. | |
| 6,680,731 B2 | 1/2004 | Gerpheide et al. | |
| 7,151,528 B2 | 12/2006 | Taylor et al. | |
| 7,218,314 B2 | 5/2007 | Itoh | |
| 7,294,959 B2 * | 11/2007 | Cok et al. | 313/501 |
| 7,439,962 B2 | 10/2008 | Reynolds et al. | |
| 7,847,790 B2 * | 12/2010 | Bewley et al. | 345/173 |
| 2006/0132458 A1 * | 6/2006 | Garfio et al. | 345/173 |
| 2007/0152983 A1 * | 7/2007 | McKillop et al. | 345/173 |
| 2008/0055265 A1 | 3/2008 | Bewley et al. | |

* cited by examiner

Primary Examiner — Jason Olson
(74) Attorney, Agent, or Firm — Lowe Graham Jones PLLC

(57) ABSTRACT

A remote control exploits a multiply tasked touchpad. The remote control includes a planar transparent substrate having an upper surface and a lower surface in opposed relation. A transparent organic light emitting diode (TOLED) is formed on the transparent substrate lower surface. A translucent touchpad overlays the TOLED affixed to the upper surface. A character projecting base-layer is affixed to the lower surface, such that when activated, the character projecting base projects a character through the transparent light emitting diode onto the translucent touchpad.

14 Claims, 4 Drawing Sheets

MULTIPLY TASKED TOUCHPAD REMOTE CONTROL

BACKGROUND OF THE INVENTION

Entertainment devices, such as televisions, television receivers (e.g., set-top boxes) and media servers have become very complicated, supporting a wide variety of feature sets. Simple remote controls with a number pad and a handful of assorted feature buttons (e.g., volume changes, channel changes, power and mute) are no longer adequate to support the enhanced feature sets available on many entertainment devices. To allow user navigation of newer feature sets on entertainment devices, advanced remote controls have been developed that provide various techniques for users to input information to the entertainment device. For example, some remote controls include touch pads or other positional input devices allowing a user to control a cursor presented on screen by an entertainment device.

Touch pads are not only very easy to master but, unlike standard keypads, touch pads may be used to dynamically assign functions to specific input means. By allowing multiple and dynamic assignment of input areas of the touchpad, navigation though nested menus is possible. Of course, the user must be aware of how parts of the touchpad are assigned.

Among touchpad remote controls, there are two schools currently extant. A first school includes remote controls having a touch pad that has no display. A user will interact with the touch pad but will receive position indicia on the screen of the television or television monitor. Thus, the user will typically see an interactive menu on the television screen that includes a cursor indicative of a position. Dragging a finger across the touchpad will move the cursor in a corresponding direction across the menu. An example of such first school remote with a touchpad is set forth in US Published Application 2006/0119585. Such systems do not include on-remote visual cues as to position and thus tend to allow a user to mistakenly activate sections of the touch screen. As a result, the user interface menus tend to be successful when fewer selections are included.

A second school includes remotes having a touchpad with elaborate displays behind them. The Sony Integrated Remote Commander Series (e.g. RM-AV3000, RM-NX7000) includes remote controls from the second school. Elaborate LCD displays behind the touchpad allow for control by positioning images immediately behind a segment of the touchpad corresponding thereto. Such a system is taught in U.S. Pat. No. 7,174,518. The shortfall of the LCD display based touchpad is that it tends to be fragile, expensive, and its full capabilities are generally not well exploited in performing many of the tasks typical of most remote controls. A user is, generally, not tolerant of elaborate menus that might fully exploit the capabilities of an LCD display; nor is the touchpad, itself, capable of such specific location of a cursor in elaborate menus.

What is needed in the art is a display behind a touch pad that can be economically manufactured to exploit the touch pad in a remote.

SUMMARY OF THE INVENTION

A remote control and a method for constructing a remote control exploit a multiply tasked touchpad. The remote control includes a planar transparent substrate having an upper surface and a lower surface in opposed relation. A transparent organic light emitting diode (TOLED) is formed on the transparent substrate lower surface. A translucent touchpad overlays the TOLED affixed to the upper surface. A character projecting base-layer is affixed to the lower surface, such that when activated, the character projecting base projects a character through the transparent light emitting diode onto the translucent touchpad.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
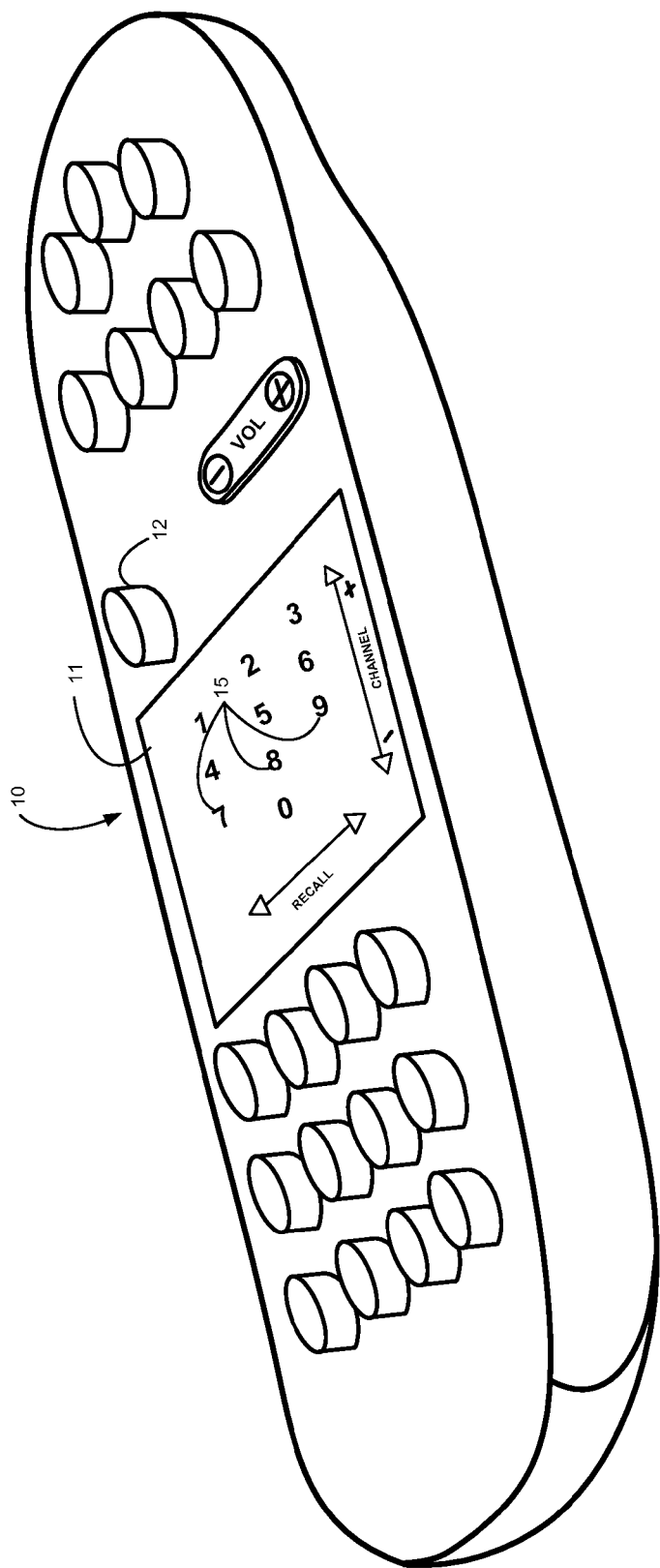
FIG. 1 is an isometric view of an inventive remote control having a multiply tasked touchpad.

Referring to FIG. 1, an exemplary remote control 10 includes a touch pad 11 having multiple sites thereon demarcated by visible characters 15. The characters 15 are made visible by backlighting the translucent touchpad 11 with lighting configured in the shape of the characters. A tasking switch 12 will alternately light one of a number of light sources to depict at least one character as discussed below and will simultaneously select a corresponding tasking for the touchpad 11 according to the displayed character or characters. The translucent touchpad 11 includes a transparent insulating sheet 18 (FIG. 2) upon one side of which are arrayed a first series of thin elongate conductors arrayed parallel one to another and upon the other side of the conductor a second series of thin elongate conductors arrayed parallel to each other and oriented at 90 degrees to the first series of thin elongate conductors forming capacitors or nodes at each point where a first series conductor is proximate to a second series conductor. A high frequency signal is applied sequentially between first series conductors and second series conductors in this two-dimensional grid array. The current that passes through the nodes is proportional to the capacitance. When a virtual ground, such as a finger, is placed over one of the intersections between the conductive layer some of the electrical field is shunted to this ground point, resulting in a change in the apparent capacitance at that location. This method received U.S. Pat. No. 5,305,017 awarded to George Gerpheide in April 1994 which is incorporated by this reference.

The translucent touchpad 11 itself is generally transparent and therefore well suited to exploiting backside illumination to form the characters 15 The characters 15 being formed by projected light, do not interfere with the operation of the translucent touchpad 11.

Figure 2:
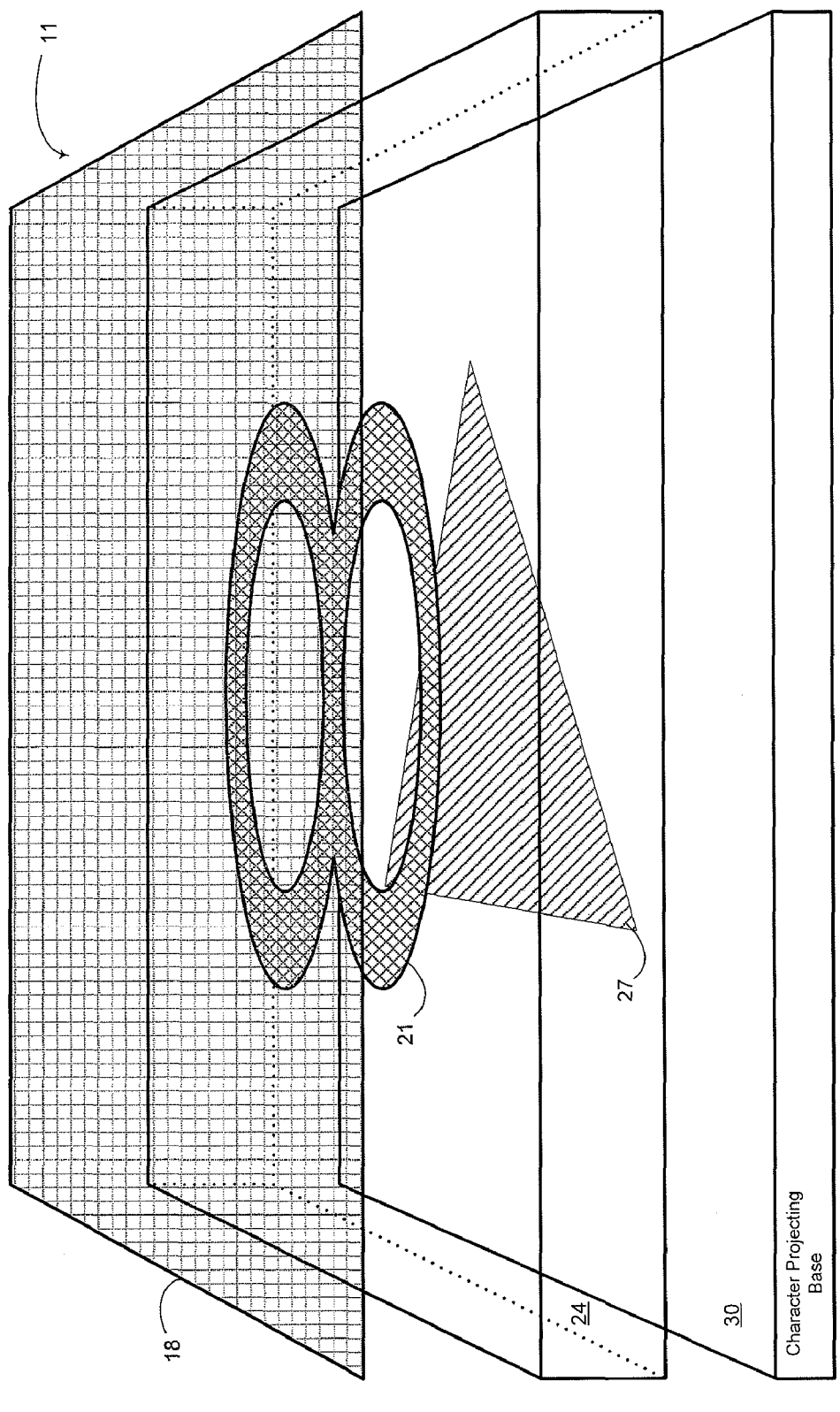
FIG. 2 is a perspective drawing of a first embodiment of the multiply tasked touchpad having a first character projecting base.
Figure 3:
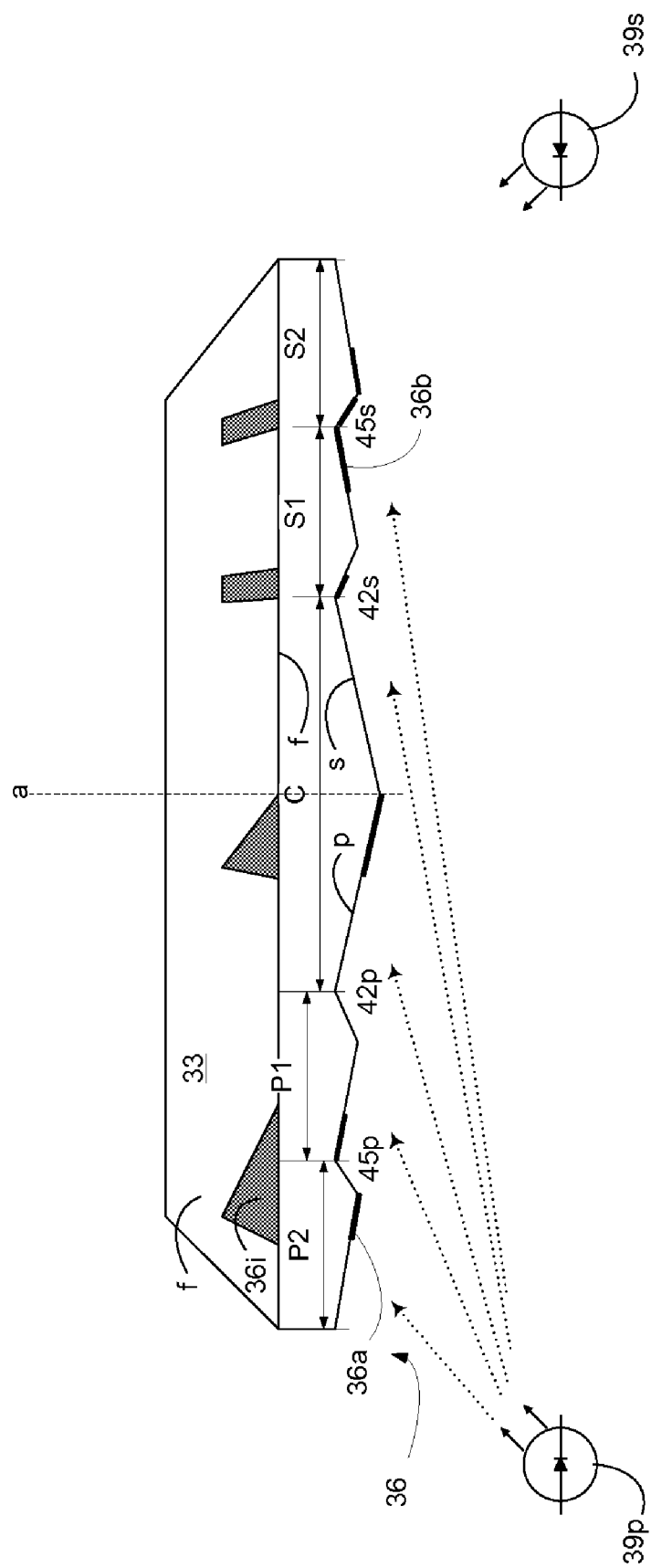
FIG. 3 is a cross-section drawing of a second embodiment of the character projecting base.

While not shown in FIGS. 1-3, the remote control 10 includes a processor that produces a control signal in accord with input from a user's interaction with the translucent touchpad 11. For example, if the touchpad is showing a character 15 that is a number, touching the touchpad in the limited segment of the touchpad in proximity to the character 15 will result in the generation of a control signal in accord with that number. By way of nonlimiting example, selection of a channel for viewing is one embodiment.

Referring to FIG. 2, the translucent touchpad 11 includes the insulating sheet 18 with the two-dimensional grid array described above with reference to FIG. 1. Configured to be generally transparent, the insulating sheet enables the translucent touchpad 11 to sense the presence and movement of a finger.

Beneath the insulating sheet 18, a transparent organic light emitting diode (TOLED) 21 is configured on a transparent substrate 24 in the form of a character 15 (FIG. 1), (shown here, for example, as an "8") organic light emitting diode (OLED), also light emitting polymer (LEP) and organic electro luminescence (OEL), is any light emitting diode (LED) whose emissive electroluminescent layer is composed of a film of organic compounds. The layer usually contains a polymer substance that allows suitable organic compounds to be deposited. They are deposited in rows and columns onto a flat carrier by a simple "printing" process. The resulting matrix of pixels can emit light of different colors. Unlike traditional liquid crystal displays (LCDs), TOLEDs are self-luminous and do not require backlighting, diffusers, polarizers, or any of the other supporting structure present in LCDs.

Essentially, the OLED consists of two charged transparent electrodes forming a sandwich around thin layers of organic light emitting material. The organic layers comprise a hole-injection layer, a hole-transport layer, an emissive layer, and an electron-transport layer. When an appropriate voltage (typically between 2 and 10 volts) is applied to the cell, the injected positive and negative charges recombine in the emissive layer to produce light (electro luminescence). The structure of the organic layers and the choice of anode and cathode are designed to maximize the recombination process in the emissive layer, thus maximizing the light output from the OLED device.

TOLEDs 21 have only transparent components (substrate 24, cathode and anode) and, when turned off, are up to 85 percent as transparent as their substrate 24. When a transparent OLED display is turned on, it allows light to pass in both directions. A transparent OLED display can be either active- or passive-matrix.

The TOLED 21 has an optical density and color when turned off. In a preferred embodiment, the substrate 24 is further treated with a generally transparent coating configured to duplicate the optical density and color of the TOLED 21 such that when the TOLED 21 is turned off, the whole of the substrate is uniformly colored and has a uniform optical density. In that regard, the substrate 24 acts as a homogenous filter when the TOLED 21 is not in an activated state.

In one embodiment of the invention, a plurality of TOLED 21 each situated on a transparent substrate 24 may be stacked over each other for projection of multiple characters through the translucent touchpad 11, though for clarity only one of the TOLED 21 disposed on the transparent substrate 24 has been set forth in FIG. 2. The purpose of the several TOLED 21 on transparent substrate is to project a distinct character in a manner identical to that of the first but to do so to project a distinct character translucent touchpad 11 when suitably and discretely activated. Because the first TOLED 21 and substrate 24 are generally transparent, a second TOLED 21 can emit light to project the character through the translucent touchpad 11, which emitted light being transmitted by the first TOLED 21 and substrate 24.

Finally, in a first embodiment of a character projecting base B, a top emitting OLED 27 (in this nonlimiting example as a directional arrowhead) as is shown on a reflective substrate 30 has a relatively transparent top electrode so that light can emit from the side of the top electrode. The top-emitting OLED 27 has two typical configurations. When the OLED structure has a transparent anode on top of the organic layers, the structure is referred to as an inverted OLED. The top-emitting OLED can be made with a transparent cathode on top of the organic layers. An OLED with a transparent anode and a transparent cathode formed on a transparent substrate is referred to as a transparent OLED as described above.

Unlike the conventional OLED structure, top-emitting OLEDs can be made on both transparent and opaque substrates. One exemplary application of the top device structure is to achieve monolithic integration of a top emitting OLED on a polycrystalline or amorphous silicon thin film transistors (TFTs) used in active matrix displays. The top emitting OLED 27 structures therefore increase the flexibility of device integration and engineering. Thus, the top-emitting OLED 27 is desirable in order to achieve high-resolution display of characters thought the translucent touchpad 11 as driving transistors can be buried underneath the top-emitting OLED 27 out of the way of emitted light.

In operation, then, the TOLED 21 on the transparent substrate 24 is (or one of two if a second is used in the device as explained above) is selectively activated in order to project the character in the shape of the TOLED 21 through the translucent touchpad 11. When suitably and discretely activated, the translucent touchpad 11 will suitably activate a first function in accord with the character the TOLED 21 depicts. Alternately, when the top emitting OLED 27 on its substrate 30 is activated, and the TOLED 21 is not activated, the translucent touchpad 11 will suitably activate a second function, in accord with the character the top-emitting OLED 27 depicts.

A second embodiment of the character projecting base B does not use the top-emitting OLED 27 (FIG. 2) on its substrate, but, rather is based upon a window as shown in FIG. 3. Though situated below the TOLED 21 (FIG. 2), a window 33 may either substitute for the top-emitting OLED 21 and its transparent substrate 30, or may be incorporated as the substrate 24, thereby obviating the need for the top-emitting OLED 21 and the substrate 30. While shown as a Fresnel lens, the window 33 may be simply a planar window 33 with a single aspect mask 36. In the more complex embodiment, the window 33 includes the Fresnel lens and multiple aspect masks 36a, 36b and, in its explanation, also completely describes the less complex variant with the planar window 33.

Prisms C, P1, P2, S1, S2 in the window 33 are defined by grooves 42p, 42s, 45p, 45s each having a coplanar first face formed by upper face of the window and second and third faces. The first face and the second faces shown as those toward the left and the third faces shown as those toward the right (to demonstrate, the center prism C is shown with its first surface f, its second surface p, and its third surface s). The purpose of the second and third optical surfaces is to receive the light rays from one of the first or second LEDs 39p, 39s and cause them to converge at first optical surface f, the upper surface of 33 into a confined bundle of rays which are directed substantially parallel to the central axis a of the window. The prisms C, P1, P2, S1, S2 formed by the grooves 42p, 42s, 45p, 45s are dioptric prisms. Dioptric prisms are commonly employed in the central region of lenses where the degree of light bending is within the capability of the refractive index of the lens material. The higher the refractive index, the farther out from the central axis a this type of prism may be used. This type of prism relies on refraction at the surfaces formed by the grooves 42p, 42s, 45p, 45s to columnate the light rays at the first surface.

The first and second optical surfaces of the prisms C, P1, P2, S1, S2 are selectively masked to allow light rays in a manner to form characters at the first optical surface f. Thus, for example, when the first LED 39p is illuminated, the mask 36a on the second surface of the prism P2 generates a shadow character 36i on the first optical surface f. If, alternately, the second LED 39s had been lit, a distinct shadow image would be generated, for example, on the first surface of the prism S1 based upon the presence of the mask 36b. In such a manner, the use of the window 33 will allow the introduction of distinct characters to be projected through the translucent touchpad 11 (FIG. 2).

Figure 4:
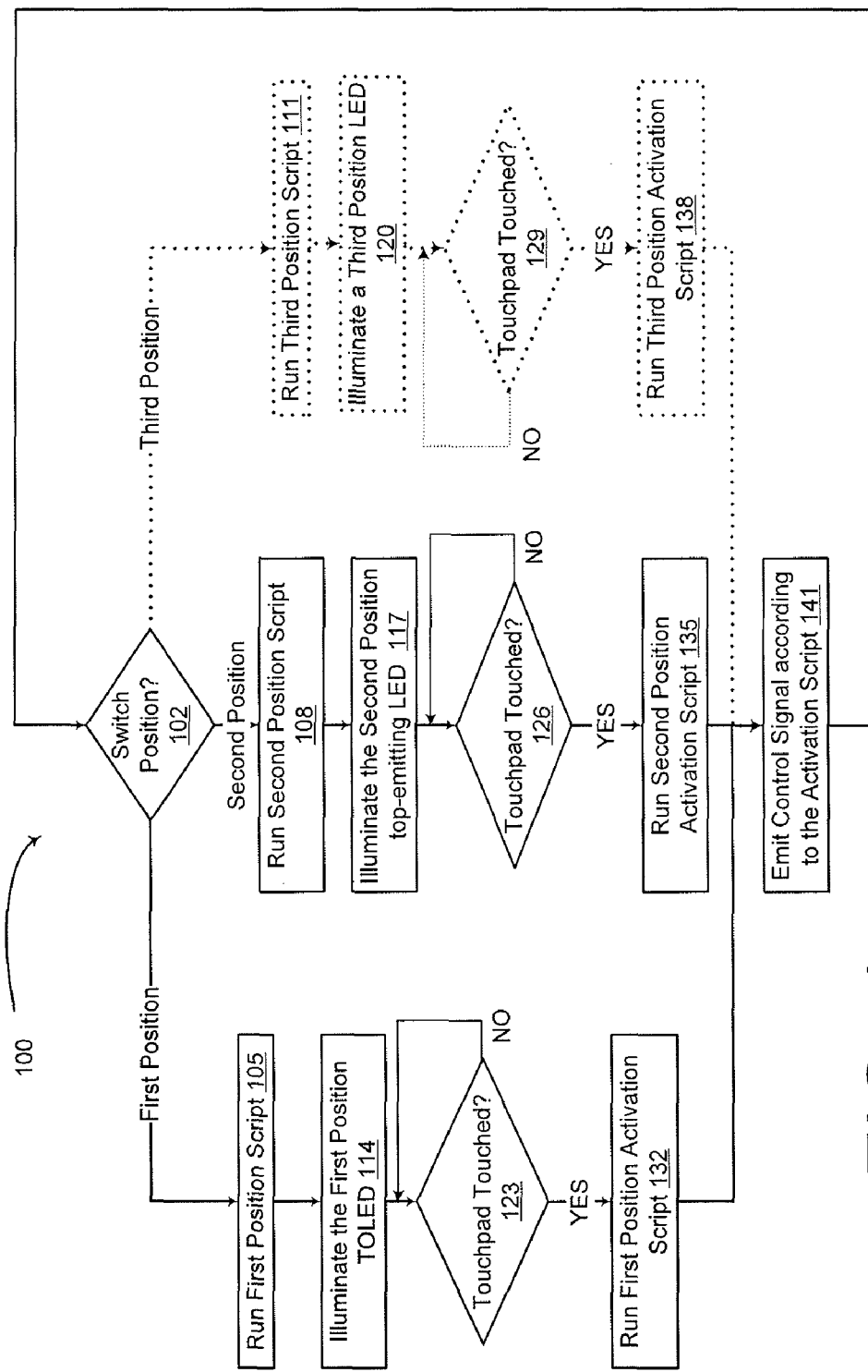
FIG. 4 is a flow chart for the interaction between the multiply tasked touchpad and the remote control.

FIG. 4 includes a flowchart 100 setting for the method of action in exploiting the inventive touchpad for interaction with a remote control 10.

At a block 102, the remote control 10 senses the content of a register to determine which of multiple modes the remote control 10 is in. In a preferred embodiment, the register is a switch with a multiply locatable contact having (as set forth in this nonlimiting example) three positions. In another embodiment of the remote control 10 (FIG. 1), the switch is a two position switch. Relays and other forms of memory such as either of volatile or nonvolatile memory serve to store and to make available for retrieval a state of a register which, in a nonlimiting fashion, will be referred to herein as a switch position. Based upon the switch position, at the block 102, the script is run to activate one of the scripts associated with the switch position. By way of non-limiting example, if the switch position is the first position, the method proceeds to execution of a first position script at a block 105; by way of further non-limiting example, if the switch position is the second position, the method proceeds to execution of a second position script at a block 108 by way of still further and optional non-limiting example, if the switch position is the third position, the method proceeds to execution of a third position script at a block 111.

In a similar manner, while only three such switch positions are shown herein, the invention is not limited to those three positions but may also be advantageously practiced with a method encompassing two, four, five, six or more positions. As is demonstrated in the discussion with reference to FIGS. 2 and 3 above, the number of distinct loops available for the method in the practice of the invention is limited only by the number of alternate characters that can be produced as images on the touchpad. Because each of the distinct loops is very similar in execution, the method can readily be adapted to encompass additional switch positions and the additional loops corresponding to those switch positions.

In executing the position script corresponding to the position sensed at the block 102, the remote control 10 will illuminate the corresponding LED to project a corresponding character thorough the touchpad 11 (FIG. 1). For example, in executing the first position script at the block 105, the remote control 10 will illuminate the transparent organic LED (TOLED) corresponding to the first position script. In a like manner, the second position corresponding with the character projecting base would include the illumination of the top-emitting organic LED projecting a corresponding character through the touchpad. Finally, for any other LED within the remote (in accord with the discussion of FIGS. 2 and 3 above), execution of the third position script at the block 120, will illuminate that LED and project the corresponding character through the touchpad.

In any of the positions sensed at the block 105, the remote control 10 will remain in a state of waiting for the touching of the touchpad in the segment of the touchpad proximate to the projected character. It is of the nature of a touchpad that distinct segments have distinct tasking. In various embodiments, a projection of a character through the touchpad 11 may include the projection of several distinct characters through distinct segments of the touchpad, allowing, for example, the selection of channels as portrayed by the state of the remote controls 10 shown in FIG. 1. As such, the sensing a touch on the touchpad at any of blocks 123, 126, and 129, is sensing of the touch in the context of one of the of multiple characters associated with each switch position and upon projection of the multiple characters through the touch pad, the segments of the touchpad are defined as being proximate to the characters and may be distinctly defined with each switch position. Thus, there is no ambiguity as to what function is requested by a user touching the touch pad in a particular location based upon the switch position.

Once the touchpad is touched in a region proximate to a projected character at any of the blocks 123, 126, and 129, the remote control 10 will execute a script based upon the position of the touched segment of the touchpad (proximate to which of the projected characters) and the position of the switch as sensed at the block 105. If in the first position, at a block 132, the first position activation script is executed; if in the second position, the second position activation script is run at a block 135, and in this nonlimiting example, if in the third position, the third position activation script is executed at a block 138.

At a block 141, the remote control 10 emits a control signal according to the particular activation script that has been executed at any of the blocks 132, 135, and 138, and in accord with the segment of the touchpad that was touched. After completing the emission of the control signal, the remote returns to the block 105 to check for any change in the position of the switch.

While the preferred embodiment of the invention has been illustrated and described, as noted above, many changes can be made without departing from the spirit and scope of the invention. For example, the switch may be capable of four or five positions. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A remote control exploiting a multiply tasked touchpad, the remote control comprising:
   a planar transparent substrate having an upper surface and a lower surface in opposed relation;
   a transparent organic light emitting diode (TOLED) disposed on the planar transparent substrate lower surface;
   a translucent touchpad overlaying the TOLED affixed to the upper surface; and
   a character projecting base-layer situated at the lower surface, such that when activated, the character projecting base projects a character through the transparent organic light emitting diode onto the translucent touchpad.

2. The remote control of claim 1, wherein the character-projecting base layer includes:
   a base substrate;
   a top-emitting light emitting diode formed on the base substrate.

3. The remote control of claim 2, wherein the base substrate is highly reflective.

4. The remote control of claim 1, wherein the character-projecting base layer includes:
   a window having a window top surface and a window bottom surface;
   a mask affixed to the lower surface to form a base character for projection through the window; and
   a light emitting diode in opposed relation to the window and positioned to project the base character through the window.

5. A remote control exploiting a multiply tasked touchpad, the remote control comprising:
    a planar transparent substrate having an upper surface and a lower surface in opposed relation;
    a transparent organic light emitting diode (TOLED) disposed on the planar transparent substrate lower surface;
    a translucent touchpad overlaying the TOLED affixed to the upper surface;
    a character projecting base-layer situated at the lower surface such that when activated, the character projecting base projects at least one of a first surface character and a second surface character through the transparent organic light emitting diode onto the translucent touchpad, and comprising:
        a window having a window top surface and a window bottom surface, wherein the window includes at least one prism, the at least one prism having a first prism surface at the window top surface, and a second prism surface and a third prism surface at the window bottom surface;
        a first surface mask affixed to the second prism surface to form a first surface character;
        a second surface mask affixed to the third prism surface to form a second surface character;
        a first light emitting diode in opposed relation to the window and positioned to emit light onto the first surface mask to project the first surface character through the window; and
        a second surface light emitting diode positioned to emit light onto the second surface mask to project the second surface character through the window.

6. The remote control of claim 5, wherein the window includes the transparent substrate.

7. The remote control of claim 1, wherein
    the planar transparent substrate includes a filter selected to match the optical density and color of the TOLED.

8. The remote control of claim 1, further comprising
    a second planar transparent substrate having an upper surface and a lower surface in opposed relation, and is interposed between the planar transparent substrate and the touchpad; and
    a second TOLED disposed on the second transparent substrate lower surface.

9. A method for multiply tasking a touchpad on a remote control, the method comprising:
    sensing a position of a tasking switch;
    lighting one of a transparent organic light emitting diode (TOLED) or a light emitting base according to the position, each of the TOLED and the light emitting base configured to project a character through a translucent touchpad;
    running a position script according to the position;
    running a position actuation script according to tasking switch in response to a touch sensed on the translucent touchpad at a location; and
    emitting a controlling signal according to the position actuation script and the location.

10. The method of claim 9, wherein the light emitting base is positioned to emit light through the TOLED.

11. The method of claim 10 wherein the light emitting base includes a window bearing a mask and an LED configured to project light to form at least one character through the mask.

12. The method of claim 11 wherein the window is a Fresnel lens and the mask includes a first character mask and a second character mask and wherein the LED includes a first character LED and a second character LED.

13. The method of claim 10 wherein the light emitting base includes a top-emitting organic LED.

14. The method of claim 13, wherein the top emitting organic LED is located at an opposite face of a planar substrate as the transparent organic LED.

* * * * *